April 16, 1935.   E. A. ROGERS   1,998,026
CLOCK COMBINED WITH ADVERTISING DEVICE
Filed Nov. 1, 1933   3 Sheets-Sheet 1
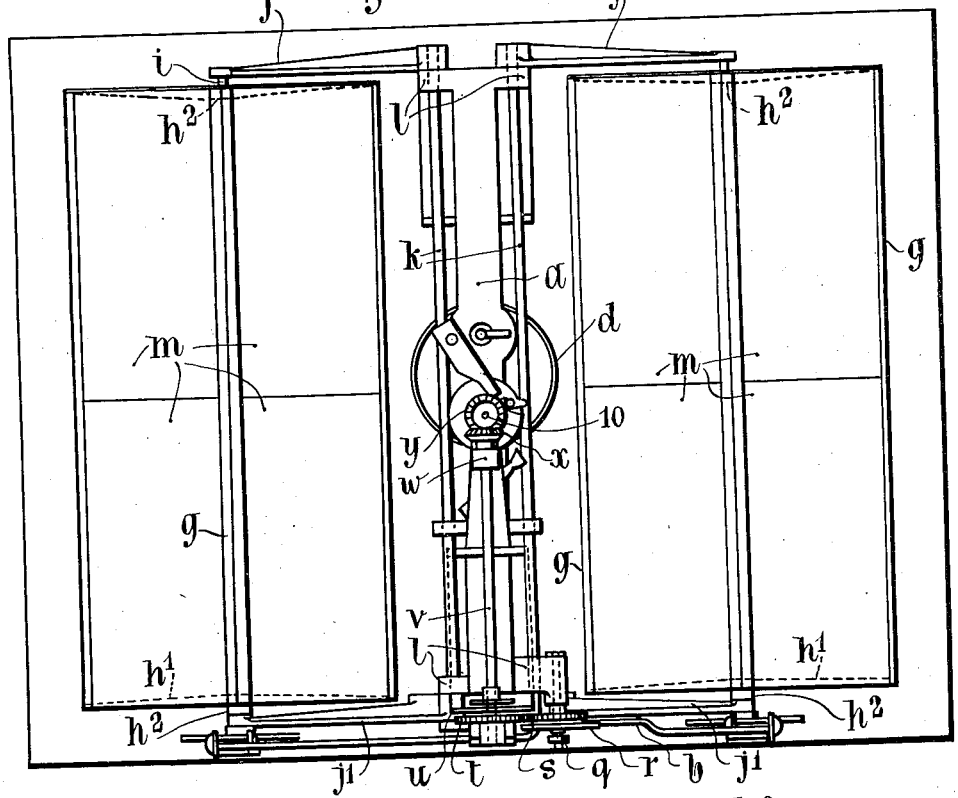
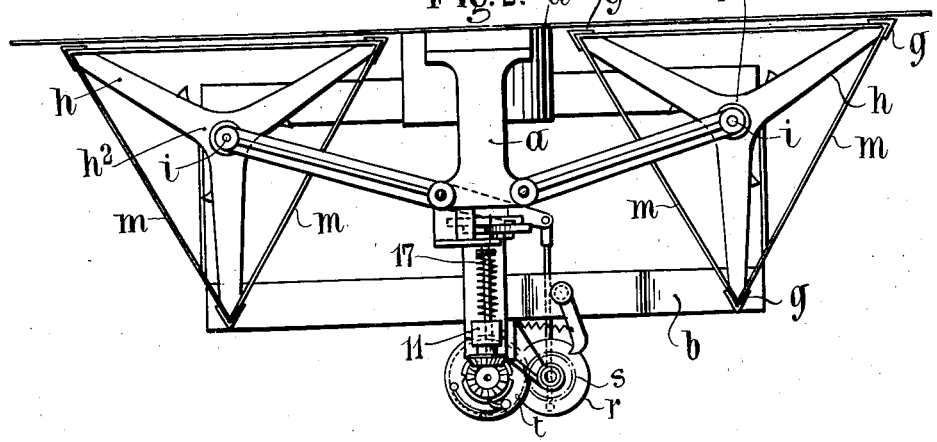
Inventor
ERNEST ABEL ROGERS,
BY
Attorneys April 16, 1935.  E. A. ROGERS  1,998,026

CLOCK COMBINED WITH ADVERTISING DEVICE

Filed Nov. 1, 1933  3 Sheets-Sheet 2

Inventor
ERNEST ABEL ROGERS,
BY
Attorneys

April 16, 1935. E. A. ROGERS 1,998,026
CLOCK COMBINED WITH ADVERTISING DEVICE
Filed Nov. 1, 1933 3 Sheets-Sheet 3
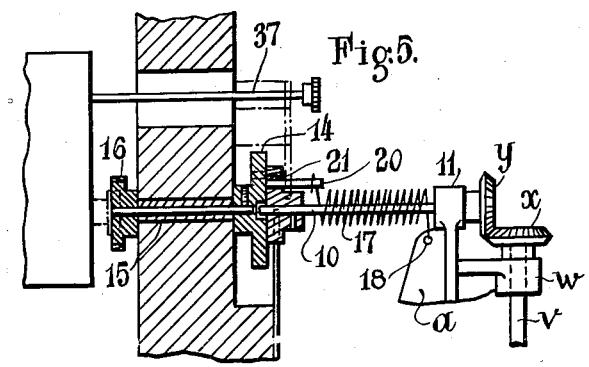
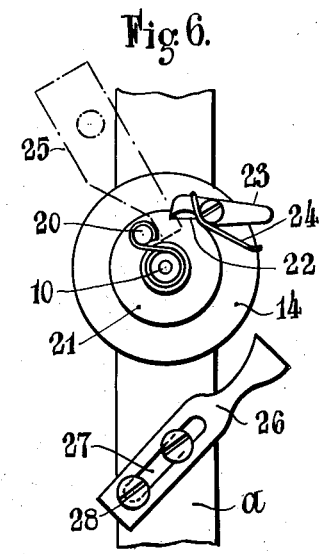
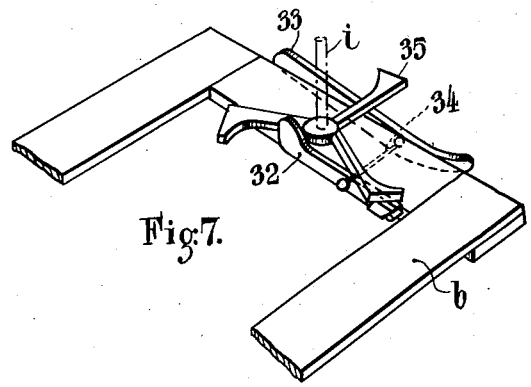
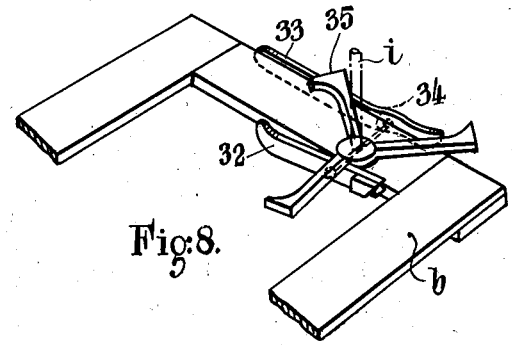
Inventor
ERNEST ABEL ROGERS, Patented Apr. 16, 1935

1,998,026

UNITED STATES PATENT OFFICE 1,998,026

CLOCK COMBINED WITH ADVERTISING DEVICE

Ernest Abel Rogers, Redfield, Bristol, England

Application November 1, 1933, Serial No. 696,236
In Great Britain November 10, 1932

17 Claims. (Cl. 40—33)

This invention relates to clocks combined with an advertising device of the kind wherein a clock is combined with a display device comprising a number of advertisements adapted to be intermittently and successively displayed and has for object to provide improvements therein.

Devices of the kind hereinbefore described usually comprise one or more drums around the periphery of which the advertisements to be displayed are carried, the drum or drums being intermittently rotated on the axis or axes to bring the advertisements successively into display position. In such devices the display area is necessarily limited by reason of the arcuate periphery of the drum.

According to the invention the advertising matter is carried on a movable structure having a number of plane display surfaces and means are provided for bodily moving the said structure out of and into operative position, together with means for rotating the said structure on its axis during the said movement to bring another display surface into operative position.

A number of structures each carrying a number of display surfaces may be provided. In this case the structures may be ganged so that they move in unison.

The operation of the said structure or structures may be effected from the clock mechanism which may be utilized to energize a spring for the purpose.

The means for turning the structure or structures may comprise shaped pivoted levers adapted to act on members carried on the movable structure or structures to cause them to turn through a predetermined angle.

One way of carrying out the present invention is illustrated by way of example in the accompanying drawings, wherein:

Fig. 1 is a rear elevation of the operating mechanism.

Fig. 2 is a plan of Fig. 1.

Figs. 5, 6, 7 and 8 are detail views.

Figure 3:
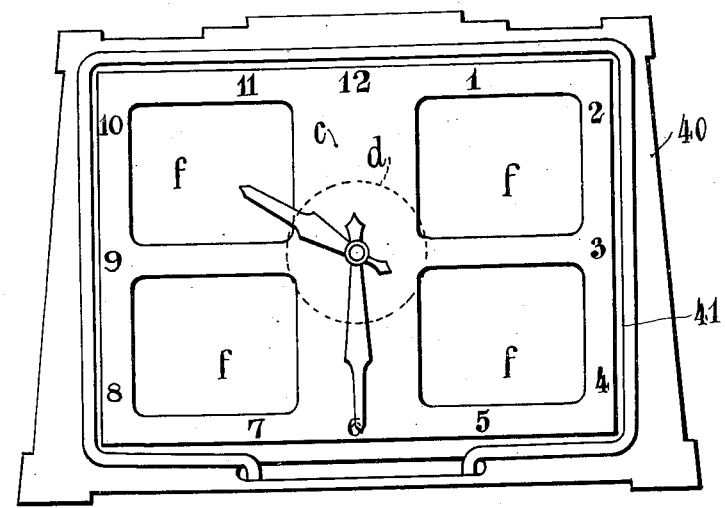
Fig. 3 is a front view of the complete clock.

In the drawings the operating mechanism is carried on a vertical aluminium pedestal $a$ which in turn is carried on a hollow rectangular metal frame $b$. The rectangular dial $c$ of the clock is secured centrally by screws or the like to the vertical pedestal $a$. An electric clock $d$ is secured centrally on the rear side of the dial, the hand shaft $e$ projecting through the dial and carrying the hands of the clock. Four rectangular apertures $f$ are cut out of the dial, namely two on each side of the clock spindle $e$, one above the other in vertical alignment. These apertures serve to display advertisements carried on open triangular frameworks mounted at the rear of the dial. The triangular frameworks consist of three V-shaped metallic strips $g$ connected together in spaced relationship at top and bottom by three-armed brackets $h$, $h^1$ provided with central bosses $h^2$ through which pass vertical rods $i$ which project therethrough at top and bottom, the projecting ends being loosely mounted in the one end of arms $j$, $j$, $j^1$, $j^1$, the other ends of the said arms $j$, $j^1$ being fixedly mounted on the projecting top and bottom ends of vertical rods $k$, $k$, the ends of which are mounted in bearings $l$ at top and bottom of the vertical pillar $a$. The open triangular frameworks are enclosed by plates $m$ which form sides to the said frameworks, the said plates bearing advertising matter and adapted to be slidden into and out of position in the V-shaped strips $g$. Six of such plates are provided on each framework, the arrangement being such that two plates of each framework constituting any one side thereof can be displayed at a time through the apertures $f$. The side of the frameworks thus displayed is automatically changed at predetermined intervals by the mechanism about to be described which rotates each framework through an angle of 120° at predetermined intervals for the purpose of bringing the adjacent side into display position. In the particular construction described this is effected periodically once in every three minutes.

The mechanism adapted to effect this automatic turning of the frames comprises means for moving the frames backwards, rotating the frames through 120° and moving them forward again into display position. The mechanism consists of toothed sectors J, J$^1$ in permanent mesh secured to the end of each arm $j$, $j^1$ and connecting rods $n$, $o$ pivotally connected together at $p$, the rod $o$ being pivotally connected to a pin $q$ projecting from the lower surface of a disc $r$ made solid with a gear wheel $s$ in permanent mesh with a gear wheel $t$ made solid with a disc $u$ loosely mounted at the lower end of a spindle $v$, the upper end of which is mounted in a bearing $w$ on the vertical pillar $a$ and terminates in a bevel wheel $x$ in permanent mesh with a bevel wheel $y$. The shaft 10 carrying the bevel wheel $y$ is supported at one end in a bearing 11 provided in the vertical pillar $a$, the other end of the shaft 10 being loosely housed in a recess provided in a disc 14 keyed to a shaft 15 driven directly from the clock mechanism through reduction gear 16. A coil spring 17 is provided on the spindle 10 one end of which is anchored in an aperture 18 provided in the vertical pillar $a$, the other end being anchored on a pin 20 formed integral with a ratchet member 21 fixed to the spindle 10. This ratchet member is provided with a peripheral recess 22 adapted to be engaged by a pawl 23 pivotally mounted on the disc 14, the said pawl being normally pressed into engagement with the recess 22 by a spring 24. A stop 25 screwed to the vertical pillar $a$ limits the movement of the pin 20 in one direction of rotation. Another stop 26 is provided capable of adjustment by reason of slot 27 and screw bolts 28. The pawl 23 is adapted to come into contact with the stop 26 the contact causing the pawl to disengage the ratchet member 21 as will be hereafter more fully described.

A free wheel device comprising a ratchet member 27 and a pawl 28 adapted to be pressed into engagement with the periphery of the ratchet by a spring 29 is disposed between the spindle $v$ and the disc $u$.

A spring pressed pivoted pawl 30 is adapted to engage in a recess in the disc $r$, whereby movement of the parts after each change is suddenly and positively arrested.

The mechanism above described constitutes the mechanism for imparting the movement to the display frameworks.

The rotation of the display frameworks through an angle of 120° is effected by pivoted guides provided on opposite end members of the hollow rectangular frame $b$. These guide members consist of shaped bars 32, 33 loosely and pivotally mounted on a common pivot pin 34. These pivoted guides are adapted to co-operate with correspondingly shaped three-armed members 35 fixed to the lower ends of the vertical spindles $i$ in the manner hereafter described. The knob 36 and spindle 37 constitute the usual starting knob for the electric clock.

The whole mechanism is contained in a casing 40 provided with doors at the sides and on top for ready access to the mechanism. A neon tube 41 is provided around the face of the clock to illuminate the latter. An internal illumination may be provided if desired.

In operation the spindle 10 is driven in a counterclockwise direction by the clock mechanism through spindle 15, disc 14, pawl 23, and the ratchet member 21. This movement is communicated through bevel wheels $y$, $x$ to spindle $v$, but the disc $u$ is not driven since in this direction of rotation the ratchet member 27' overrides the pivoted pawl 28 (see Fig. 4). During this counter-clockwise rotation of the spindle 10 energy is stored up in the spring 17.

After about half a revolution the pawl 23 abuts against the stop 26, whereby the nose of the pawl comes out of engagement with the recess 22 thereby releasing the driving connection between the disc 14 and the spindle 10. The latter is now free to rotate in a clockwise direction by reason of the energy stored up in the coil spring 17. This movement of rotation in the opposite direction is communicated through bevel wheels $y$, $x$ to spindle $v$ and from the latter through ratchet member 27', pawl 28' and gear wheel $t$ to gear wheel $s$, and from the latter through connecting rods $o$, $p$ to toothed segment $J^1$ whereby both arms $j$, $j^1$ are rotated rearwards, the triangular display frameworks sharing this rearward movement. During this rearward movement an initial turning movement is imparted to the display frameworks in the manner illustrated in Fig. 7. In this figure it will be seen that one arm of the member 35 is about to abut against one end of the guide 32. The arms of the member 35 are shaped so that when abutting against the end of the guide 32 the member 35 during the rearward movement of the frameworks will be rotated to the position shown in Fig. 8, which figure shows the position of the member 35 as the frameworks are about to be returned to the starting position. The ratio of the gearing $t$, $s$ ensures that for a partial rotation of the gear $t$ a complete revolution of the gear $s$ will be effected so that at the end of the movement the rods $n$, $o$ and segments $J$, $J^1$ will be returned to the starting position. Another arm of the member 35 abuts against the raised edge of the guide 33, the arrangement being such that during the return movement a further turning movement is imparted to the frameworks, the extent of the whole movement being 120°. In this way the frameworks are returned to the display position (that is, so that the display surface is adjacent the rear of the dial) after having been turned through 120°. In the form described the display frameworks are changed once every three minutes.

Figure 4:
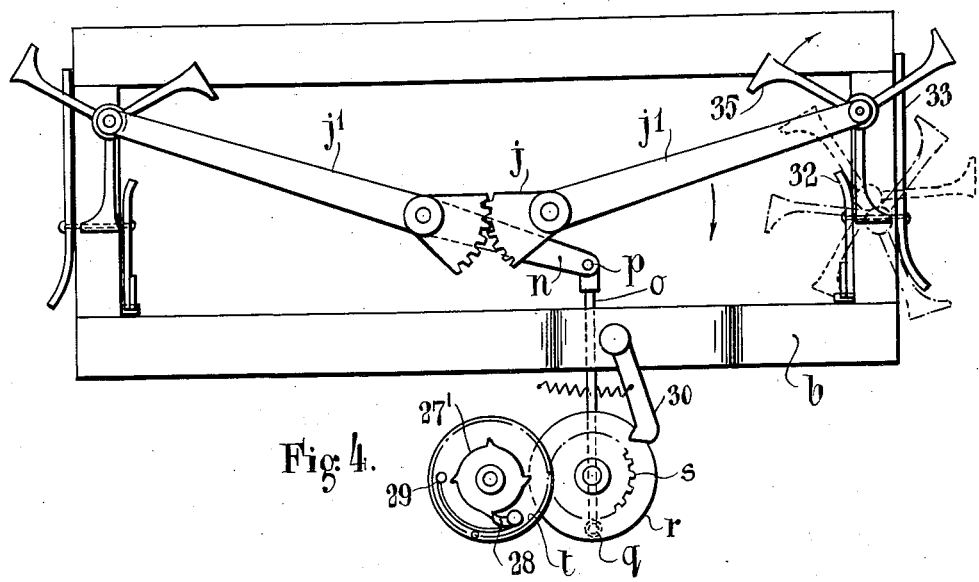
Fig. 4 is a plan view of some of the operating mechanism.

In Fig. 4 the member 35 is shown in full lines, in dotted lines and in dot and dash lines. The full lines represent the normal display position of the frameworks. The dotted lines represent the position substantially the same as that shown in Fig. 7. The dot and dash lines represent the position substantially as shown in Fig. 8. It will be understood that when the guides 32, 34 have served their purpose of rotating the member 35 the latter can ride over the said guides since the projecting parts can be depressed by the weight of the member 35 and the weight carried thereby which causes the guides 32, 33 to rotate about the pivot 34.

At the end of the movement the pawl 30 engages the peripheral recess in the disc $r$ thereby bringing all the parts immediately to rest.

That side of the rectangular framework $b$ disposed immediately behind the gears $t$, $s$ is locally raised somewhat to enable the rod $o$ to pass underneath as is clearly shown in Fig. 1.

A sound or light signal, such as a gong or an electric lamp, may be incorporated in the device to give audible or visible warning when the movement of the triangulated structures is about to, or is, taking place, to draw attention to the change of advertising matter.

The device is in no way limited to the particular form described and may be varied in many ways without departing from the scope of the invention. For example, the movable frameworks carrying the advertising matter may have two or more than three sides to be brought successively or otherwise into operation. The period of display and consequently the time of changing the advertisements may be varied as desired.

Illuminating means may be provided in association with some or all of the plaques or advertising plates for illuminating some or all of the advertisements, and means may be provided for time controlling the time of illumination. For example, one advertisement may be "Just time to buy a packet of cigarettes" and such an advertisement may be illuminated and a gong sounded at, say, five minutes before the legal time of closing the shop.

The movable structure may be ganged in order to make a display. Other modifications may be incorporated.

The invention is not limited to the use of an electric clock. A mechanical clock may be used.

Further, it will be understood that the mechanism for actuating the display device may be quite separate from the clock mechanism.

What I claim and desire to secure by Letters Patent is:—

1. In combination with a clock having an aperture for the display of advertising matter, a display device comprising a movable structure, a number of plane display surfaces on the movable structure, means automatically and intermittently operable by the clock mechanism for bodily moving the said structure out of and back into operative position adjacent the display aperture in the clock and means for rotating the said structure on its axis during the said movement to bring another display surface into operative position.

2. In combination with a clock having an aperture for the display of advertising matter, a display device comprising a movable structure, a number of plane display surfaces on the movable structure, spring means automatically and intermittently operable by the clock mechanism for bodily moving the said structure out of and into operative position adjacent the display aperture in the clock and means for rotating the said structure on its axis during the said movement to bring another display surface into operative position.

3. In combination with a clock having an aperture for the display of advertising matter, a display device comprising a movable structure, a number of plane display surfaces on the movable structure, means for bodily moving the said structure out of and back into operative position adjacent the display aperture in the clock and means for rotating the said structure on its axis during the said movement to bring another display surface into operative position, the said means comprising shaped pivoted levers co-operating with suitably shaped members carried in the movable structure.

4. In combination with a clock having an aperture for the display of advertising matter, a display device comprising a movable structure, a number of plane display surfaces on the movable structure, means automatically and intermittently operable by the clock mechanism for bodily moving the said structure out of and back into operative position adjacent the display aperture in the clock and means for rotating the said structure on its axis during the said movement to bring another display surface into operative position, the said means comprising shaped pivoted levers co-operating with suitably shaped members carried in the movable structure.

5. In combination with a clock having an aperture for the display of advertising matter, a display device comprising a movable structure, a number of plane display surfaces on the movable structure, means for bodily moving the said structure out of and back into operative position adjacent the display aperture in the clock the said means comprising a spring, one end of which is fixedly located and the other end is fixed to a member intermittently driven by the clock whereby the spring is intermittently energized, together with means for intermittently releasing the energy stored in the spring.

6. In combination with a clock having an aperture for the display of advertising matter, a display device comprising a movable structure, a number of plane display surfaces on the movable structure, means for bodily moving the said structure out of and back into operative position adjacent the display aperture in the clock the said means comprising a spring, one end of which is fixedly located and the other end is fixed to a member intermittently driven by the clock whereby the spring is intermittently energized, together with means for intermittently releasing the energy stored in the spring, and means for rotating the said structure on its axis during the said movement to bring another display surface into operative position, the said means comprising shaped pivoted levers cooperating with suitable shaped members carried in the movable structure.

7. In combination with a clock having an aperture for the display of advertising matter, a display device comprising a movable structure, a number of plane display surfaces on the movable structure, means for bodily moving the said structure out of and back into operative position adjacent the display aperture in the clock, the said means comprising a spindle driven by the clock mechanism, a rotatable member, a free wheel device disposed between the spindle and the rotatable member, a spring surrounding the rotatable member, one end of which is fixed to the driven member of the free wheel device and the other end of which is fixed in position, and a tripping device to uncouple the free wheel intermittently to release the energy stored in the spring which thereby becomes available to move the said structure, and means for rotating the said structure on its axis during this movement to bring another display surface into operative position, substantially as described.

8. In combination with a clock having an aperture for the display of advertising matter, a display device comprising a movable structure, a number of plane display surfaces on the movable structure, means for bodily moving the said structure out of and back into operative position adjacent the display aperture in the clock, the said means comprising a spindle driven by the clock mechanism, a rotatable member, a free wheel device disposed between the spindle and the rotatable member, a spring surrounding the rotatable member one end of which is fixed to the driven member of the free wheel device and the other end of which is fixed in position, and a tripping device to uncouple the free wheel intermittently to release the energy stored in the spring, a transmission system operably associated with the said spring to transmit the energy thus released to the movable structure, the said system including a free wheel device to prevent the structure being moved directly from the clock mechanism, and means for rotating the said structure on its axis during the said movement to bring another display surface into operative position.

9. In combination with a clock having an aperture for the display of advertising matter, a display device comprising a movable structure, a number of plane display surfaces on the movable structure, means for bodily moving the said structure out of and back into operative position adjacent the display aperture in the clock, the said means comprising a spindle driven by the clock mechanism, a rotatable member, a free wheel device disposed between the spindle and the rotatable member, a spring surrounding the rotatable member one end of which is fixed to the driven member of the free wheel device and the other end of which is fixed in position, and a tripping device to uncouple the free wheel intermittently to release the energy stored in the spring, a transmission system operably associated with the said spring to transmit the energy thus released to the movable structure, the said system including a free wheel device to prevent the structure being moved directly from the clock mechanism, and means for rotating the said structure on its axis during the said movement to bring another display surface into operative position, the said means comprising shaped pivoted levers co-operating with suitably shaped members carried on the movable structures.

10. In combination with a clock having apertures for the display of advertising matter a display device comprising a plurality of movable structures ganged together so as to move in unison, a number of plane display surfaces on each of the movable structures, means automatically and intermittently operable by the clock mechanism for bodily moving the said structures out of and back into operative position adjacent the display apertures in the clock and means for rotating the said structures on their axes during the said movement to bring other display surfaces into operative position.

11. In combination with a clock having apertures for the display of advertising matter a display device comprising a plurality of movable structures ganged together so as to move in unison, a number of plane display surfaces on each of the movable structures, means for bodily moving the said structures out of and back into operative position adjacent the display apertures in the clock and means for rotating the said structures on their axes during the said movement to bring other display surfaces into operative position, the said means comprising shaped pivoted levers co-operating with suitably shaped members carried on the movable structures.

12. In combination with a clock having apertures for the display of advertising matter a display device comprising a plurality of movable structures ganged together so as to move in unison, a number of plane display surfaces on each of the movable structures, means for bodily moving the said structures out of and back into operative position adjacent the display apertures in the clock the said means comprising a spring, one end of which is fixedly located and the other end is fixed to a member intermittently driven by the clock whereby the spring is intermittently energized, together with means for intermittently releasing the energy stored in the spring, and means for rotating the said structures on their axes during the said movement to bring other display surfaces into operative position.

13. In combination with a clock having apertures for the display of advertising matter a display device comprising a plurality of movable structures ganged together so as to move in unison, a number of plane display surfaces on each of the movable structures, means for bodily moving the said structures simultaneously out of and back into operative position adjacent the display apertures in the clock the said means comprising a spring, one end of which is fixedly located and the other end is fixed to a member intermittently driven by the clock whereby the spring is intermittently energized, together with means for intermittently releasing the energy stored in the spring, and means for rotating the said structures on their axes during the said movement to bring other display surfaces into operative position, the said means comprising shaped pivoted levers co-operating with suitably shaped members carried in the movable structure.

14. In combination with a clock having apertures for the display of advertising matter, a display device comprising a plurality of movable structures ganged together so as to move in unison, a number of plane display surfaces on each movable structure, means for bodily moving the said structures simultaneously out of and back into operative position adjacent the display apertures in the clock, the said means comprising a rotatable member, a free wheel device disposed between the rotatable member and a spindle driven by the clock mechanism, a spring, one end of which is fixed to the driven member of the free wheel device and the other end of which is fixed in position, and a tripping device to uncouple the free wheel intermittently to release the energy stored in the spring which thereby becomes available to move the said structures, and means for rotating the said structures on their axes during this movement to bring other display surfaces into operative position, substantially as described.

15. In combination with a clock having apertures for the display of advertising matter, a display device comprising a plurality of movable structures ganged together so as to move in unison, a number of plane display surfaces on each movable structure, means for bodily moving the said structures simultaneously out of and back into operative position adjacent the display apertures in the clock, the said means comprising a rotatable member, a free wheel device disposed between the rotatable member and a spindle driven by the clock mechanism, a spring one end of which is fixed to the driven member of the free wheel device and the other end of which is fixed in position, and a tripping device to uncouple the free wheel intermittently to release the energy stored in the spring, a transmission system operably associated with the said spring to transmit the energy thus released to each of the movable structures, the said system including a free wheel device to prevent the structures being moved directly from the clock mechanism, and means for rotating the said structures on their axes during the said movement to bring other display surfaces into operative position.

16. In combination with a clock having apertures for the display of advertising matter, a display device comprising a plurality of movable structures ganged together so as to move in unison, a number of plane display surfaces on each movable structure, means for bodily moving the said structures simultaneously out of and back into operative position adjacent the display apertures in the clock, the said means comprising a spindle driven by the clock mechanism, a rotatable member, a free wheel device disposed between the spindle and the rotatable member, a spring surrounding the rotatable member one end of which is fixed to the driven member of the free wheel device and the other end of which is fixed in position, and a tripping device to uncouple the free wheel intermittently to release the energy stored in the spring, a transmission system operably associated with the said spring to transmit the energy thus released to each of the movable structures, the said system including a free wheel device to prevent the structures being moved directly from the clock mechanism, and means for rotating the said structures on their axes during the said movement to bring other display surfaces into operative position, the said means comprising shaped pivoted levers co-operating with suitably shaped members carried on the movable structures.

17. In combination with a clock having an aperture for the display of advertising matter, a display device comprising a movable structure, a number of plane display surfaces on the movable structure, readily attachable and detachable plates bearing advertising matter carried on the said display surfaces, means for bodily moving the said structure out of and back into operative position adjacent the display aperture in the clock, and means for rotating the said structure on its axis during the said movement to bring another display surface into operative position.

ERNEST ABEL ROGERS.